United States Patent
Guo et al.

(10) Patent No.: US 9,910,977 B2
(45) Date of Patent: Mar. 6, 2018

(54) DATA SHARING BETWEEN MULTIPLE APPLICATIONS RUNNING ON A MOBILE DEVICE

(71) Applicant: International Business Machines Corporation, Armonk, NY (US)

(72) Inventors: Hongwei Guo, Beijing (CN); Long He, Beijing (CN); Fangming Li, Beijing (CN); Xiao Qiu Tang, Beijing (CN); Xi Ning Wang, Beijing (CN); Jing Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 14/600,073

(22) Filed: Jan. 20, 2015

(65) Prior Publication Data
US 2015/0227736 A1  Aug. 13, 2015

(30) Foreign Application Priority Data
Feb. 8, 2014  (CN) .......................... 2014 1 0046016

(51) Int. Cl.
*G06F 21/00* (2013.01)
*G06F 21/44* (2013.01)
(Continued)

(52) U.S. Cl.
CPC ................ *G06F 21/44* (2013.01); *G06F 9/54* (2013.01); *G06F 21/6281* (2013.01); *H04W 12/08* (2013.01); *H04W 88/02* (2013.01)

(58) Field of Classification Search
CPC .... G06F 13/14; G06F 3/04817; G06F 3/0488; G06F 3/1454; G06F 21/31; G06F 3/0486
See application file for complete search history.

(56) References Cited

U.S. PATENT DOCUMENTS

| 6,934,740 | B1 | 8/2005 | Lawande et al. |
| 8,799,994 | B2 | 8/2014 | Barton et al. |

(Continued)

FOREIGN PATENT DOCUMENTS

| WO | 2008084386 A1 | 7/2008 |
| WO | 2012044735 A2 | 4/2012 |

OTHER PUBLICATIONS

"UIPasteboard Class Reference", Updated Dec. 16, 2013, Copyright © 2014 Apple Inc., <https://developer.apple.com/library/ios/documentation/uikit/reference/uipasteboard_class/index.html>.
(Continued)

*Primary Examiner* — Ghazal Shehni
(74) *Attorney, Agent, or Firm* — Edward P. Li (57) ABSTRACT

A method and a computer system for data sharing between multiple applications running on a mobile device are provided. The method comprising: receiving from a second application among the multiple applications an access request to first data in a first application among the multiple applications; in response to the access request, enabling the second application to access the first data via a sharing zone between the first application and the second application; and wherein the sharing zone is built by obtaining an access right over the first data, obtaining an access policy assigned by the first application to the second application for access to the first data, and building the sharing zone according to the access policy by using the access right. By means of the method and the computer system of the present invention, data can be shared between various applications running on a mobile device without changing developed applications.

17 Claims, 7 Drawing Sheets

(51) Int. Cl.
*G06F 9/54* (2006.01)
*G06F 21/62* (2013.01)
*H04W 12/08* (2009.01)
*H04W 88/02* (2009.01)

(56) References Cited

U.S. PATENT DOCUMENTS

| | | |
|---|---|---|
| 2011/0161880 A1 | 6/2011 | Abbott et al. |
| 2013/0239192 A1* | 9/2013 | Linga ...................... G06F 21/44 726/7 |
| 2013/0273879 A1 | 10/2013 | Eisen et al. |
| 2013/0297662 A1* | 11/2013 | Sharma ............... H04L 63/0815 707/827 |
| 2014/0018048 A1 | 1/2014 | Anand et al. |

OTHER PUBLICATIONS

"Sending Simple Data to Other Apps", Android Developers, provided in Search Report dated Oct. 24, 2013, <http://developer.android.com/training/sharing/send.html>.
"Storage Options", Android Developers, provided in Search Report dated Oct. 24, 2013, <http://developer.android.com/guide/topics/data/data-storage.html>.
China Patent Application 201410046016.6 (English Translation), titled "Data Sharing Between Multiple Applications Running on Mobile Device", Filed Feb. 8, 2014.

\* cited by examiner

DATA SHARING BETWEEN MULTIPLE APPLICATIONS RUNNING ON A MOBILE DEVICE

CROSS REFERENCE TO RELATED APPLICATION

This application claims the benefit of priority from Chinese Patent Application No. 201410046016.6 filed on Feb. 8, 2014, the entirety of which is incorporated by reference.

FIELD OF THE INVENTION

The present invention relates generally to data sharing, and more specifically, and more particularly to a method and a computer system for data sharing between multiple applications running on a mobile device.

BACKGROUND

With the development of computer hardware technology, sizes of computer devices get smaller and smaller while computation performance thereof is improved gradually. At present, mobile devices, such as smart phones, personal digital assistants, tablet computers and so on, can provide an increasingly strong data processing capability. In addition, as operating systems of mobile devices are perfected gradually, more and more applications have been developed for running on mobile devices. Mobile device users can download, either for free or for a fee, applications used for different operating systems (e.g., iOS (iPhone Operating System), Android Operating System or any other possible operating system).

Nowadays applications for running on mobile devices can provide more and more diversified functions, such as instant message communication, email sending and receiving, word processing, gaming, etc. Therefore, how to share data between these applications providing different functions becomes an issue.

A simple scenario of data sharing is that, for example, a user wants to forward a message that is received by an instant messaging application to a contact in the form of an email. At this point, typically, the user first opens the instant messaging application, finds a message to be forwarded, and performs a "copy" operation after selecting the message; afterwards, the user opens the email application, performs a "paste" operation in an email edit window and presses the "send" button, thereby fulfilling desired actions. It may be understood the user has to manually perform a series of operations such as opening, selecting, copying, opening, pasting and sending. Therefore, how to share data between applications conveniently and rapidly becomes a problem.

SUMMARY

Therefore, it is desired to develop a technical solution enabling data sharing between multiple applications conveniently and rapidly. It is desired the technical solution can achieve data sharing without modifying existing application code; it is desired the technical solution can provide custom service to users so that they can define what data is shared between which applications; further, it is desired the technical solution can provide a security mechanism with respect to data sharing.

According to one aspect of the present invention, a method for data sharing between multiple applications running on a mobile device is provided, comprising: receiving from a second application among the multiple applications an access request to first data in a first application among the multiple applications; and enabling the second application to access the first data via a sharing zone between the first application and the second application in response to the access request, wherein the sharing zone is built by: obtaining an access right over the first data; obtaining an access policy assigned by the first application to the second application for access to the first data; and building the sharing zone according to the access policy by using the access right.

In one embodiment of the present invention, building the sharing zone according to the access policy by using the access right comprises: storing in the sharing zone an address mapping pointing to the first data of the first application.

In one embodiment of the present invention, enabling, in response to the access request, the second application to access the first data via a sharing zone between the first application and the second application comprises: in response to the access request conforming to the access policy, directing the access request to the first data based on the address mapping.

In one embodiment of the present invention, a computer system for data sharing between multiple applications running on a mobile device is provided, comprising: a receiving module configured to receive from a second application among the multiple applications an access request to first data in a first application among the multiple applications; and an access module configured to enable the second application to access the first data via a sharing zone between the first application and the second application in response to the access request, wherein the sharing zone is built by: obtaining an access right over the first data; obtaining an access policy assigned by the first application to the second application for access to the first data; and building the sharing zone according to the access policy by using the access right.

In one embodiment of the present invention, building the sharing zone according to the access policy by using the access right comprises: storing in the sharing zone an address mapping pointing to the first data of the first application.

In one embodiment of the present invention, the access module comprises: a directing module configured to, in response to the access request conforming to the access policy, direct the access request to the first data based on the address mapping.

By means of the method and computer system of the present invention, data can be shared between various applications running on a mobile device without changing developed applications. Moreover, the method and computer system of the present invention can be implemented with respect to different operating systems of mobile devices.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or server or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
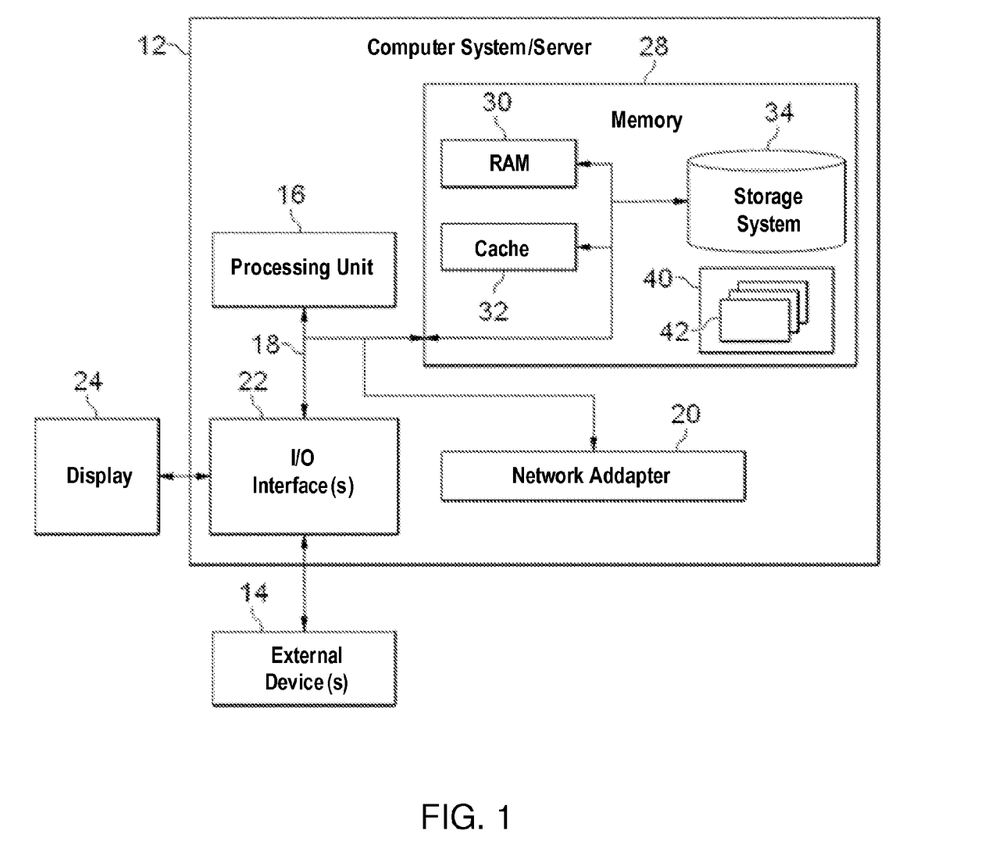
FIG. 1 schematically shows an exemplary mobile device which is applicable to implement the embodiments of the present invention, in accordance with one embodiment of the present invention.

Referring now to FIG. 1, mobile device 12 is applicable to implement the embodiments of the present invention. Mobile device 12 is only illustrative and is not intended to suggest any limitation as to the scope of use or functionality of embodiments of the invention described herein.

As shown in FIG. 1, mobile device 12 is shown in the form of a general-purpose computing device. The components of mobile device 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Mobile device 12 typically includes a variety of computer system readable media. Such media may be any available media that is accessible by mobile device 12, and it includes both volatile and non-volatile media, removable and non-removable media.

System memory 28 can include computer system readable media in the form of volatile memory, such as random access memory (RAM) 30 and/or cache memory 32. Mobile device 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Mobile device 12 may also communicate with one or more external devices 14 such as a keyboard, a pointing device, a display 24, etc.; one or more devices that enable a user to interact with mobile device 12; and/or any devices (e.g., network card, modem, etc.) that enable mobile device 12 to communicate with one or more other computing devices. Such communication can occur via Input/Output (I/O) interfaces 22. Still yet, mobile device 12 can communicate with one or more networks such as a local area network (LAN), a general wide area network (WAN), and/or a public network (e.g., the Internet) via network adapter 20. As depicted, network adapter 20 communicates with the other components of mobile device 12 via bus 18. It should be understood that although not shown, other hardware and/or software components could be used in conjunction with mobile device 12. Examples include, but are not limited to: microcode, device drivers, redundant processing units, external disk drive arrays, RAID (redundant array of independent disks) systems, tape drives, and data archival storage systems, etc.

Note the above described schematic block diagram of the mobile device which is applicable to implement a method and apparatus of the present invention is for illustration only, and the mobile device mentioned in the present invention may further comprise more or less components or may further comprise an architecture view different from that shown in FIG. 1.

Figure 2:
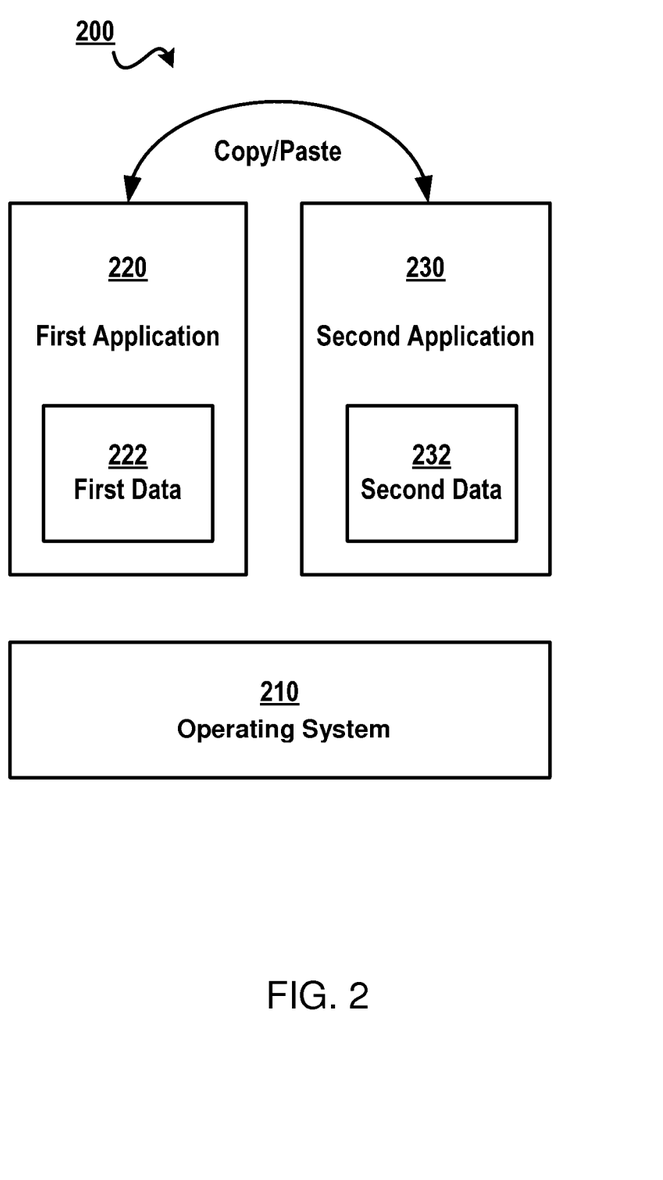
FIG. 2 schematically shows a block diagram of a method for data sharing between multiple applications according to one solution, in accordance with one embodiment of the present invention.

Note, however, due to characteristics of the mobile device operating system and implementations of applications running on the mobile device, applications on the mobile device cannot share data. FIG. 2 schematically shows block diagram 200 of a method for data sharing between multiple applications according to one solution. As shown in this figure, operating system 210 may be installed on the mobile device; operating system 210 may be, for example, an iOS, an Android operating system, or any other possible operating system, and used for providing functions like processor management and memory management for the running of the mobile device.

Various applications may be installed on operating system 210, such as an instant messaging application, an email application, an image processing application, a gaming application, etc. Note after first application 220 and second application 230 are installed on the mobile device, respective data (e.g., first data 222 and second data 232) of first application 220 and second application 230 are invisible to external applications. For example, first application 220 can only access its own first data 222, and second application 230 can only access its own second data 232.

In this case, data is private data of an application. Data sharing between various applications, when necessary, is implemented by above-mentioned copy/paste. Although the copy/paste can achieve data sharing to some extent, such sharing is completed through user manual operations by means of the operating system's "pasteboard", which is time-consuming and laborious; on the other hand, data objects to be copied/pasted are also limited, for example, only data of such types as text and image can be copied; moreover, due to limitations of the "pasteboard" capacity, the user can only copy limited data each time.

Besides copy/paste, there is further provided in iOS a document interaction function which allows registry of file type associations, and applications can specify specific file types they are able to open. Although this function allows different applications to open the same file, the function requires copy operation to be performed on a to-be-opened file, and has no security control policy when opening files.

Moreover, there is provided in an Android operating system a ContentProvider service. This service allows application developers to set a policy about sharing data with other applications in design/development phase (rather than running phase). Once the development of an application is completed, the sharing policy cannot be modified in runtime.

In view of the above drawbacks in these technical solutions, it is desired to develop a technical solution capable of data sharing between multiple applications, and it is desired this solution can be implemented on the premise of not modifying program code of existing applications. In addition, it is desired that users can define what data is shared between which applications, and it is desired that users can formulate a security control policy (e.g., control of read/write rights, etc.) on their own.

Figure 3:
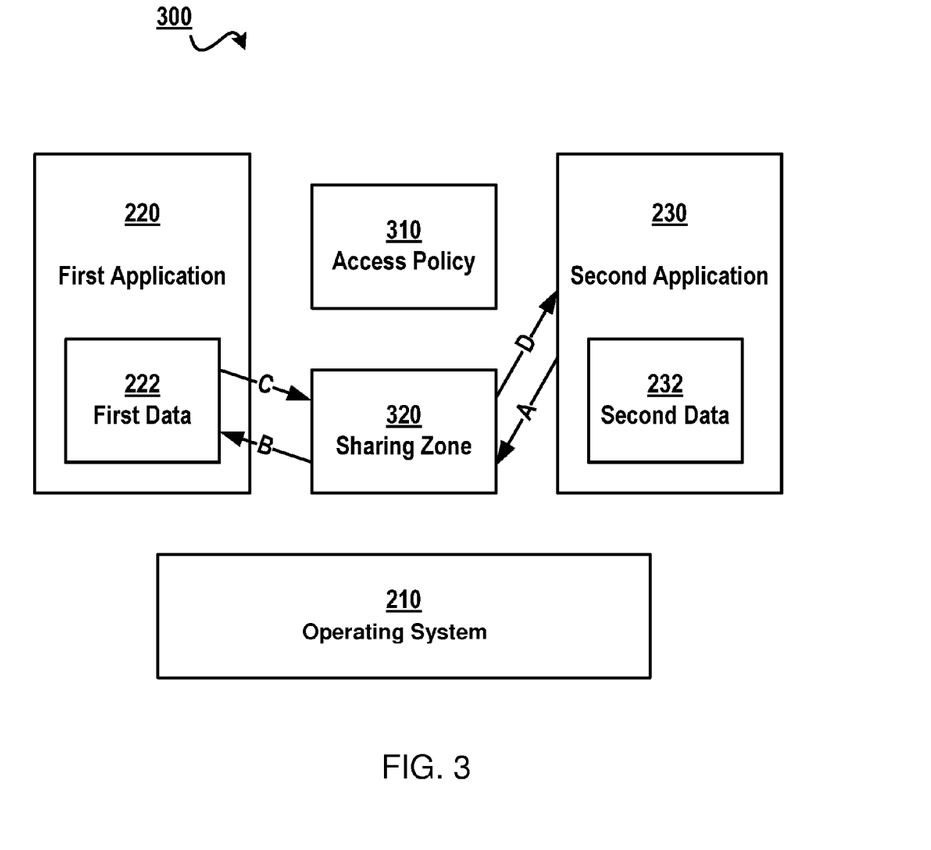
FIG. 3 schematically shows a block diagram of a method for data sharing between multiple applications, in accordance with one embodiment of the present invention.

The present invention provides a method for data sharing between multiple applications. FIG. 3 schematically shows block diagram 300 of a method for data sharing between multiple applications according to one embodiment of the present invention. As shown in this figure, according to principles of the present invention, the user can define access policy 310 with respect to access to data in applications. For example, it may be specified in access policy 310 that second application 230 can access first data 222 in first application 220, and access right is read-only access.

By means of the embodiment of the present invention, a sharing zone 320 may be set for second application 230 to access first data 222 in first application 220. Where both access policy 310 and sharing zone 320 have been set, the access process may be shown below: first of all, second application 230 requests to access first data 222 in first application 220 via sharing zone 320 (as shown by arrow A); the request is directed to an address of first data 222 in first application 220 (as shown by arrow B); and subsequently, accessed data is returned to second application 230 via sharing zone 320 (as shown by arrows C and D).

Since the sharing zone has a higher access right than the second application (for example, the sharing zone may be implemented at the operating system level or by expanding functions of the operating system), sharing zone 320 can access data in each application. By using the sharing zone as an intermedium, second application 230 can access first data 222 in first application 220. Note sharing zone 320 may act as an intermedium when faced with various applications running on the mobile device. In concrete implementation, the sharing zone may be implemented using address mapping. For example, the sharing zone may record addresses of data that used to be "private" to various applications, so that other applications can access these addresses.

Although FIG. 3 illustrates only two applications, namely first application 220 and second application 230, those skilled in the art may achieve data sharing between multiple applications based on the principles described in the present invention. For example, it may further be defined that a third application can access data in first application 220. In addition, each access right may be defined, such as read-only rights or read/write rights.

Detailed description is presented below of concrete implementation of the present invention. In one embodiment of the present invention, a method for data sharing between applications running on a mobile device is provided, comprising: receiving from a second application among the applications an access request to first data in a first application among the applications; and in response to the access request, enabling the second application to access the first data via a sharing zone between the first application and the second application, wherein the sharing zone is built by: obtaining an access right over the first data; obtaining an access policy assigned by the first application to the second application for access to the first data; and building the sharing zone according to the access policy by using the access right.

Figure 4:
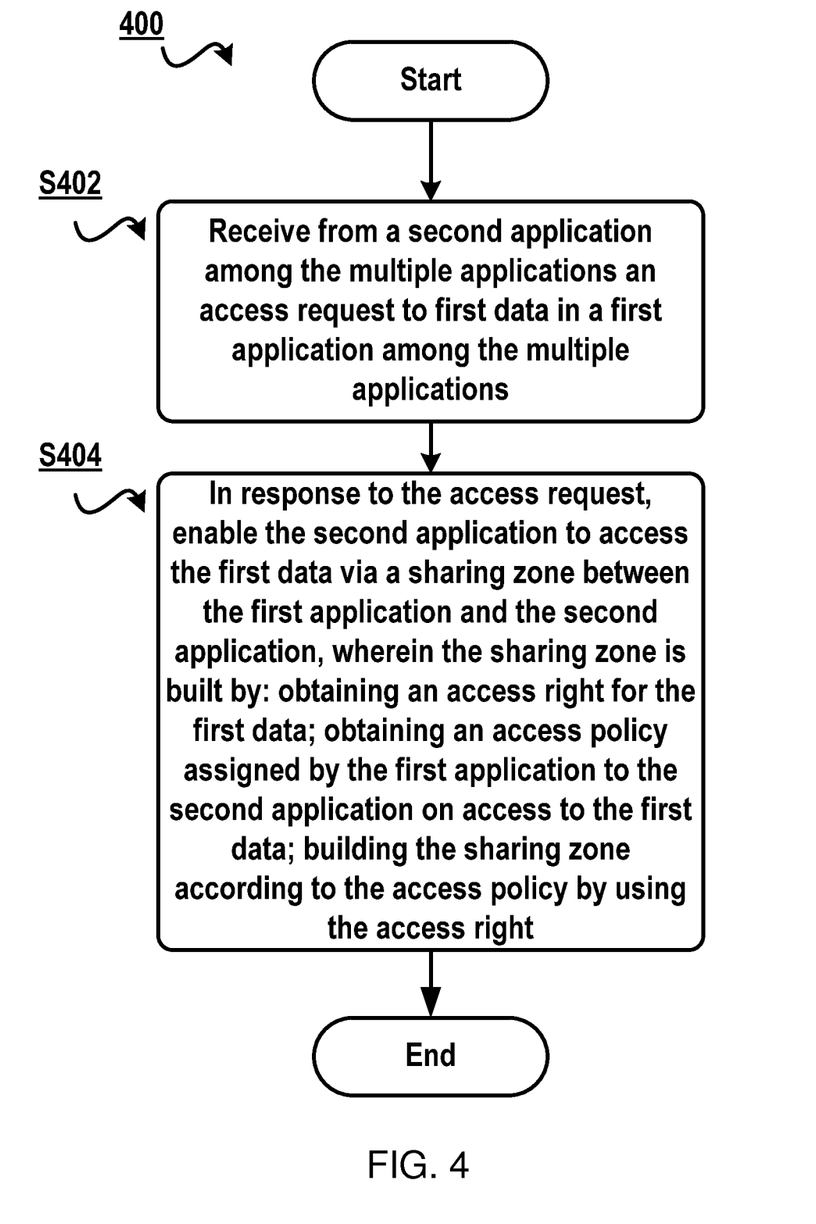
FIG. 4 schematically shows a flowchart of a method for data sharing between multiple applications, in accordance with one embodiment of the present invention.

Detailed description with reference to FIG. 4 is now presented. This figure schematically shows flowchart 400 of a method for data sharing between multiple applications according to one embodiment of the present invention. First of all, at step S402, an access request to first data in a first application among the applications is received from a second application among the applications.

At step S404, in response to the access request, the second application is enabled to access the first data via a sharing zone between the first application and the second application. In this embodiment, import information is stored in the sharing zone pointing to an accessible portion of the first data in the first application. Therefore, when receiving the access from second application to the first data, the second application is directed via the sharing zone to access the first data in the first application.

Those skilled in the art should note the "first application" and "second application" throughout the context of the present invention are merely two examples of the "multiple applications" running on the mobile device, and concrete functions of each application are not limited here. In addition, the terms "first" and "second" in the present invention are only intended to differentiate applications, and there is no ordering between two applications. Specifically, when the email application accesses chat records in the instant messaging application, the instant messaging application and the email application correspond to the first application and the second application, respectively; when the instant messaging application accesses received mails in the email application, the email application and the instant messaging application correspond to the first application and the second application, respectively.

In the embodiment as shown in FIG. 4, the sharing zone is built by: obtaining an access policy assigned by the first application to the second application for access to the first data; building the sharing zone according to the access policy by using the access right. Description is presented below to the steps for building the sharing zone.

First, an access right over the first data is obtained. Note the method of the present invention may be implemented at a hierarchy that is more underlying than the application, so as to access data that used to be "private" to various applications. The "access right" in this embodiment may refer to having a "read right" or having both a read operation right and a write operation right. For example, when only read operations to the first data are allowed but write operations are not allowed, the access right may only comprise a read right.

Subsequently, an access policy assigned by the first application to the second application for access to the first data is obtained. Here, the access policy refers to which kind of access the second application may perform to the first data in the first application, such as read access and/or write access. In this embodiment, the access policy may be applied to all first data in the first application or part of data in the first application.

For example, suppose the first application is an instant messaging application and the second application is an email application, then an access policy below may be specified: allowing the email application to access all chat records in the instant messaging application, or only allowing the email application to access chat records related to a specific user in the instant messaging application, or only allowing the email application to access text data but not image data in all chat records. Table 1 shows an example of the access policy according to one embodiment of the present invention.

TABLE 1

Example 1 of Access Policy

| No. | Accessing Application | Access Right |
|---|---|---|
| 1 | Second Application | Read |
| 2 | Third Application | Read/Write |
| ... | | |

Note the data structure in Table 1 is only illustrative. According to the principles described above, those skilled in the art may design a data structure for storing the access policy, which is not detailed here.

Finally, the sharing zone is built according to the access policy by using the access right. According to the principles of the present invention, the sharing zone acts as intermedium between the first application and the second application, so as to support the second application to access the first data that was "private" to the first application according to the predetermined access policy. In this embodiment, the sharing zone is built for a purpose of only opening to the second application the access right that conforms to the access policy, but shielding the second application from rights that do not conform to the access policy.

Specifically, when the access policy is that the second application can read a text portion in all chat records, then in the sharing zone, there is only provided address information of an area where text data in all chat records is stored, but address information of an area where image data in chat records is stored is not provided.

In one embodiment of the present invention, building the sharing zone according to the access policy by using the access right comprises: storing in the sharing zone an address mapping pointing to the first data of the first application. Suppose the first data in the first application is stored in file 1 at an address vzone://zone1/app1/ . . . in the mobile device's memory, then a data structure as shown in Table 2 shown below may be stored in the sharing zone.

TABLE 2

Address Mapping

| Sharing Zone Name | Application | Address | File Name |
|---|---|---|---|
| area 1 | first application | vzone://zone1/app1/ . . . | file 1 |

Those skilled in the art should note although a circumstance where only one sharing zone exists on the mobile device has been shown above, those skilled in the art may build a plurality of sharing zones on the mobile device based on the above described principles. For example, when the email application desires to access chat records in the instant messaging application, a first sharing zone may be built; when a social network application desires to access data in a gaming application, a second sharing zone may be built, etc.

In one embodiment of the present invention, enabling the second application to access the first data via a sharing zone between the first application and the second application comprises: in response to the access request, conforming to the access policy, directing the access request to the first data based on the address mapping.

The second application may access the first data via the address mapping as shown in Table 2 above. Note the embodiment of the present invention further provides a security mechanism, i.e., the second application accesses the first data only by right granted by the access policy. Specifically, for example, it may be predefined when the email application accesses chat records in the instant messaging application, the email application only has a read right. Therefore, the email application may read chat records to its own email edit window and modify to-be-sent emails in the email edit window but cannot modify raw data of chat records.

In one embodiment of the present invention, a finer-grained access policy may further be provided. According to one embodiment, the access policy comprises at least: data type, and access right with respect to the data type. Table 3 below shows another example of the access policy. Specifically, corresponding access rights may be set with respect to different data types in the first data. Suppose chat records in the instant messaging application include text data and image data, then respective access rights may be set with reference to different types. As shown in Table 3, a read-only access right may be set with respect to text data, while a read/write access right may be set for image data.

TABLE 3

Example 2 of Access Policy

| No. | Data Type | Accessing Application | Access Right |
|---|---|---|---|
| 1 | text | second application | read |
| 2 | image | second application | read/write |
| 3 | text | third application | read |
| . . . | | | |

Figure 5A:
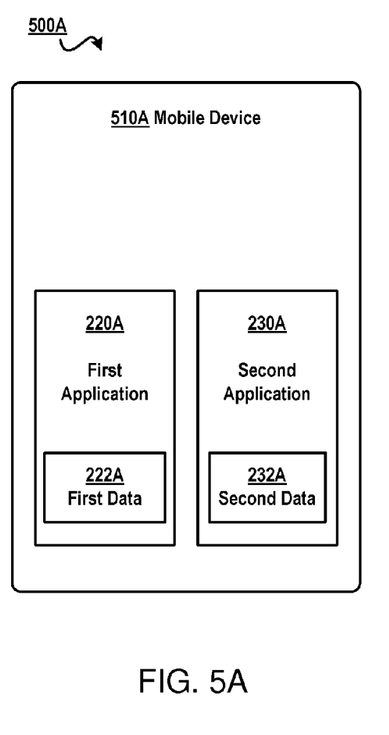
FIGS. 5A and 5B schematically show block diagrams of applications installed on a mobile device, in accordance with one embodiment of the present invention.
Figure 5B:
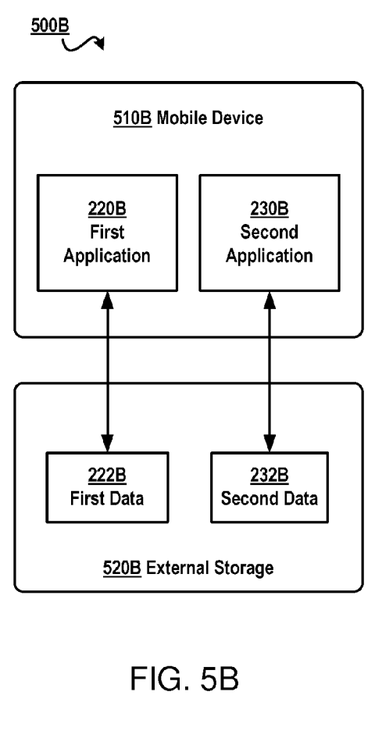

FIGS. 5A and 5B schematically show block diagrams 500A and 500B of applications installed on a mobile device according to one embodiment of the present invention. In different circumstances as shown in FIGS. 5A and 5B, an access right over the first data may be obtained using different approaches.

Specifically, in one embodiment of the present invention, obtaining an access right over the first data comprises: obtaining the access right at an operating system hierarchy of the mobile device. An application environment of this embodiment is as shown in FIG. 5A. Both first application 220A and second application 230A are installed on a mobile device 510A, and they are two independent applications, wherein first application 220A can only access its own first data 222A and application 230A can only access its own second data 232A.

At this point, since the mobile device's operating system provides management and control for memories and has an access right over all address spaces, in the circumstance as shown in FIG. 5A, the access right over first data 222A may be obtained at the operating system hierarchy of the mobile device. In this embodiment, data access operations may be executed at the operating system hierarchy.

In addition, in one embodiment of the present invention, the first data resides in an external storage of the mobile device, and obtaining an access right over the first data comprises: obtaining the access right based on access to the external storage. An application environment of this embodiment is shown in FIG. 5B.

In this embodiment, the control portion (first application 220B) and the data portion (first data 222B) in the application are installed on a mobile device 510B and an external storage 520B (e.g., an external SD card of a mobile device with the Android system). At this point, access to first data 222B on external storage 520B can be implemented without the operating system hierarchy. In one embodiment of the present invention, the access right may be obtained based on access to the external storage (i.e., data is read from and/or written to external storage 520B).

Figure 6:
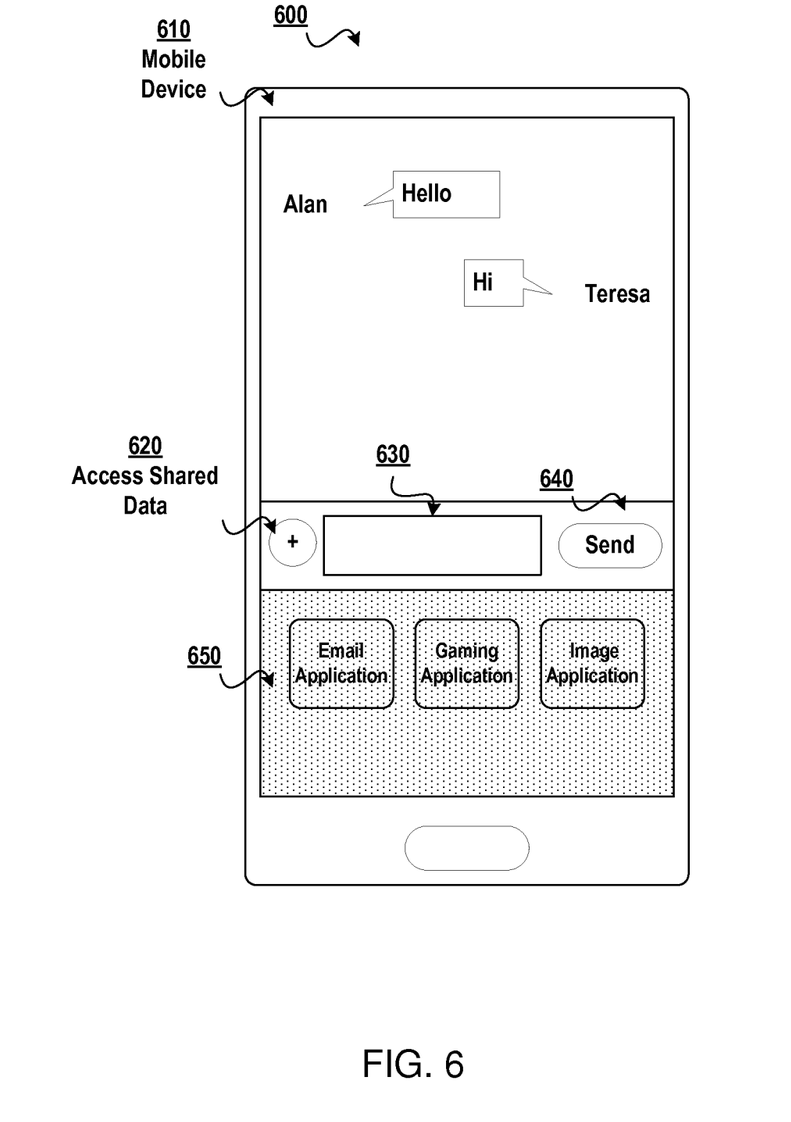
FIG. 6 shows a schematic view where an instant messaging application accesses data in an email application, in accordance with one embodiment of the present invention.

FIG. 6 shows schematic view 600 where the instant messaging application accesses the email application according to one embodiment of the present invention. FIG. 6 schematically shows a user interface of the instant messaging application. As shown in this figure, the instant messaging application is installed on mobile device 610, and at this point, two users, Alan and Teresa, are chatting to each other. In this example, Teresa is a user of mobile device 610, and it is supposed Teresa wants to forward a received email to Alan. Then, a comparison between operations according to the prior art and according to the technical solution of the present invention is as below.

According to the prior art, Teresa may first open a to-be-forwarded mail in the email application, copy all contents of the mail to a paste board, paste copied contents to message edit box 630 of the instant messaging application, and then click on send button 640 before completing the forwarding step; or Teresa may first save the to-be-forwarded mail as a separate file and send the file to Alan as an attachment.

According to the technical solution of the present invention, Teresa may click on button 620 shown in "+" for accessing shared data, whereby an interface as shown in shadow portion 650 in FIG. 6 will pop up, the shadow portion showing 3 applications, namely an email application, a gaming application and an image application. All three applications are accessible by the current instant messaging application. At this point, Teresa only needs to select the "email application" to select an email to be forwarded to Alan in an interface where the email application pops up, and press send button 640 to forward the email to Alan directly.

It may be understood from the above comparison that the technical solution of the present invention greatly simplifies manual operations for sharing data between multiple applications and can provide a more convenient and friendly data sharing approach.

In one embodiment of the present invention, obtaining an access policy assigned by the first application to the second application on access to the first data comprises at least one of: obtaining the access policy from rules defined by a user of the mobile device; and obtaining the access policy from agreements between providers of the first application and the second application.

The embodiment of the present invention provides personalized custom service. For example, the user may use the method of the present invention to customize a sharing policy between different applications. For example, the user may define: the email application can access all historical records in the instant messaging application, the instant messaging application can access all information in the gaming application, while the gaming application cannot access private data of any other application.

In addition, providers of different applications may further sign a data sharing agreement, for example, a social network application provider may sign an agreement with an instant messaging application provider so as to share all data between these two applications, etc. In this case, the user only needs to import an agreement signed between application providers in advance, thereby completely sharing data between the two applications.

In one embodiment of the present invention, the method is implemented independently of the first application and the second application. Note the technical solution of the present invention does not rely on the development of the first application and the second application, but is a data management method implemented independently of the first application and the second application. The method relies on the mobile device's operating system and may be implemented at the mobile device's operating system hierarchy (e.g., based on iOS, Android operating system or any other possible operating system).

Figure 7:
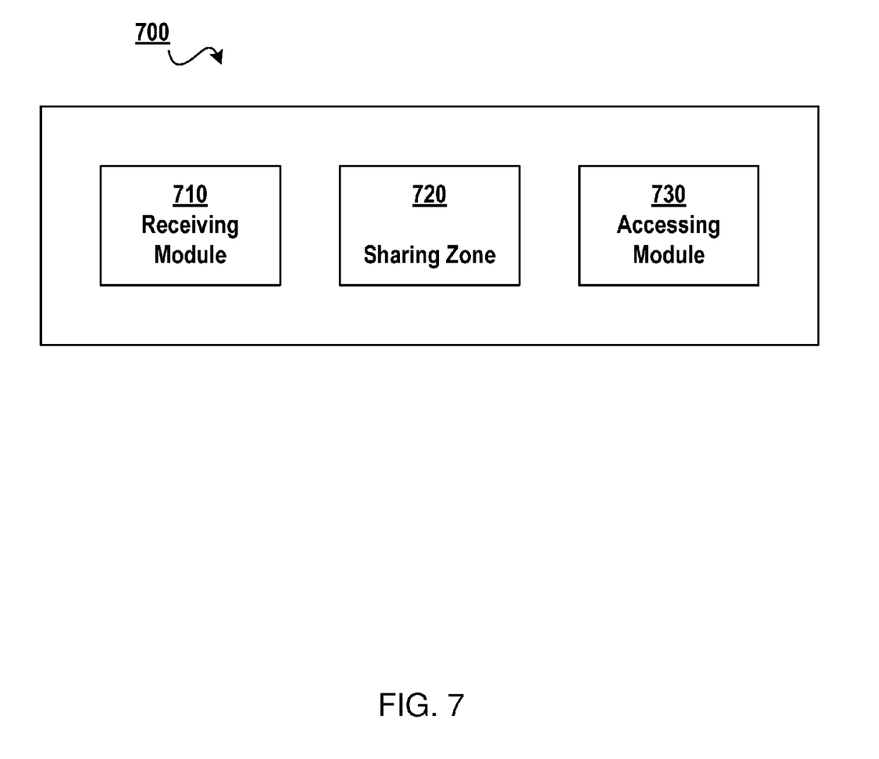
FIG. 7 schematically shows a block diagram of an apparatus for data sharing between multiple applications, in accordance with one embodiment of the present invention.

FIG. 7 schematically shows block diagram 700 of an apparatus for data sharing between multiple applications according to one embodiment of the present invention. As shown in FIG. 7, there is a provided apparatus for data sharing between multiple applications running on a mobile device, comprising: receiving module 710 configured to receive from a second application among the multiple applications an access request to first data in a first application among the multiple applications; and accessing module 730 configured to, in response to the access request, enable the second application to access the first data via sharing zone 720 between the first application and the second application, wherein sharing zone 720 is built by: obtaining an access right over the first data; obtaining an access policy assigned by the first application to the second application for access to the first data; and building the sharing zone according to the access policy by using the access right.

In one embodiment of the present invention, building the sharing zone according to the access policy by using the access right comprises: storing in the sharing zone an address mapping pointing to the first data of the first application.

In one embodiment of the present invention, access module 730 comprises: a directing module configured to direct the access request to the first data based on the address mapping in response to the access request conforming to the access policy.

In one embodiment of the present invention, the access policy comprises at least: data type, and access right with respect to the data type.

In one embodiment of the present invention, obtaining an access right over the first data comprises: obtaining the access right at an operating system hierarchy of the mobile device.

In one embodiment of the present invention, the first data resides in an external storage of the mobile device, and obtaining an access right over the first data comprises: obtaining the access right based on access to the external storage.

In one embodiment of the present invention, obtaining an access policy assigned by the first application to the second application for access to the first data comprises at least one of: obtaining the access policy from rules defined by a user of the mobile device; and obtaining the access policy from agreements between providers of the first application and the second application.

In one embodiment of the present invention, the apparatus is implemented independently of the first application and the second application. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data sharing between multiple applications running on a mobile device, comprising:
    receiving, by one or more processors on the mobile device, from a second application among the multiple applications on the mobile device, an access request for first data in a first application among the multiple applications on the mobile device;
    enabling, by the one or more processors on the mobile device, the second application to access the first data via a sharing zone on the mobile device and between the first application and the second application, in response to the access request, wherein the sharing zone on the mobile device comprises addresses of the first data and the addresses are accessed by the second application, wherein the sharing zone has an access right at an operating system hierarchy of the mobile device; and
    wherein the sharing zone is built by obtaining the access right over the first data, obtaining an access policy assigned by the first application to the second application for access to the first data, and building the sharing zone according to the access policy by using the access right.

2. The method of claim 1, wherein building the sharing zone according to the access policy by using the access right comprises:
    storing, by the one or more processors on the mobile device, in the sharing zone an address mapping pointing to the first data of the first application.

3. The method of claim 1, wherein enabling the second application to access the first data via the sharing zone between the first application and the second application in response to the access request comprises:
    in response to the access request conforming to the access policy, directing, by the one or more processors on the mobile device, the access request to the first data based on an address mapping.

4. The method of claim 1, wherein the access policy comprises at least: data type and the access right with respect to the data type.

5. The method of claim 1, wherein obtaining the access right over the first data comprises:
    obtaining, by the one or more processors on the mobile device, the access right at an operating system hierarchy of the mobile device.

6. The method of claim 1, wherein the first data resides in an external storage of the mobile device, and obtaining the access right over the first data comprises: obtaining, by the one or more processors on the mobile device, the access right based on access to the external storage.

7. The method of claim 1, wherein obtaining the access policy assigned by the first application to the second application for access to the first data comprises at least one of:
    obtaining, by the one or more processors on the mobile device, the access policy from rules defined by a user of the mobile device; and
    obtaining, by the one or more processors on the mobile device, the access policy from agreements between providers of the first application and the second application.

8. The method of claim 1, wherein the method is implemented independently of the first application and the second application.

9. A computer system for data sharing between multiple applications running on a mobile device, the computer system comprising:
    one or more processors, one or more computer readable tangible storage devices, and program instructions stored on at least one of the one or more computer readable tangible storage devices for execution by at least one of the one or more processors;
    a receiving module configured to receive, by the one or more processors, from a second application among the multiple applications on the mobile device, an access request to first data in a first application among the multiple applications on the mobile device;
    an access module configured to enable, by the one or more processors, the second application to access the first data via a sharing zone on the mobile device and between the first application and the second application in response to the access request, wherein the sharing zone on the mobile device comprises addresses of the first data and the addresses are accessed by the second application, wherein the sharing zone has an access right at an operating system hierarchy of the mobile device; and
    wherein the sharing zone is built by obtaining the access right over the first data, obtaining an access policy assigned by the first application to the second application for access to the first data, and building the sharing zone according to the access policy by using the access right.

10. The computer system of claim 9, wherein building the sharing zone according to the access policy by using the access right comprises:
    storing, by the one or more processors, in the sharing zone an address mapping pointing to the first data of the first application.

11. The computer system of claim 9, wherein the access module comprises:
    a directing module configured to, in response to the access request conforming to the access policy, direct, by the one or more processors, the access request to the first data based on an address mapping.

12. The computer system of claim 9, wherein the access policy comprises at least: data type and the access right with respect to the data type.

13. The computer system of claim 9, wherein obtaining the access right over the first data comprises:
    obtaining, by the one or more processors, the access right at an operating system hierarchy of the mobile device.

14. The computer system of claim 9, wherein the first data resides in an external storage of the mobile device, and obtaining the access right over the first data comprises: obtaining, by the one or more processors, the access right based on access to the external storage.

15. The computer system of claim 9, wherein obtaining the access policy assigned by the first application to the second application for access to the first data comprises at least one of:

obtaining, by the one or more processors, the access policy from rules defined by a user of the mobile device; and obtaining, by the one or more processors, the access policy from agreements between providers of the first application and the second application.

16. The computer system of claim 9, wherein the computer system is implemented independently of the first application and the second application.

17. A computer program product for data sharing between multiple applications running on a mobile device, the computer program product comprising a non-transitory computer readable storage medium having program code embodied therewith, the program code executable to:

receive, by one or more processors on the mobile device, from a second application among the multiple applications on the mobile device, an access request to first data in a first application among the multiple applications on the mobile device;

enable, by the one or more processors on the mobile device, the second application to access the first data via a sharing zone on the mobile device and between the first application and the second application in response to the access request, wherein the sharing zone on the mobile device comprises addresses of the first data and the addresses are accessed by the second application, wherein the sharing zone has an access right at an operating system hierarchy of the mobile device; and wherein the sharing zone is built by obtaining the access right over the first data, obtaining an access policy assigned by the first application to the second application for access to the first data, and building the sharing zone according to the access policy by using the access right.

* * * * *